United States Patent
Matsuyama

(10) Patent No.: US 12,431,485 B2
(45) Date of Patent: Sep. 30, 2025

(54) POSITIVE ELECTRODE AND LITHIUM ION BATTERY

(71) Applicant: TOYOTA JIDOSHA KABUSHIKI KAISHA, Toyota (JP)

(72) Inventor: Takuya Matsuyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 575 days.

(21) Appl. No.: 17/974,637

(22) Filed: Oct. 27, 2022

(65) Prior Publication Data

US 2023/0155111 A1  May 18, 2023

(30) Foreign Application Priority Data

Nov. 15, 2021 (JP) .................................. 2021-185854

(51) Int. Cl.
- *H01M 4/36* (2006.01)
- *H01M 4/505* (2010.01)
- *H01M 4/525* (2010.01)
- *H01M 4/02* (2006.01)

(52) U.S. Cl.
CPC .......... *H01M 4/364* (2013.01); *H01M 4/505* (2013.01); *H01M 4/525* (2013.01); *H01M 2004/028* (2013.01)

(58) Field of Classification Search
CPC ...... H01M 4/131; H01M 4/364; H01M 4/485; H01M 4/505; H01M 4/525
See application file for complete search history.

(56) References Cited

U.S. PATENT DOCUMENTS

| | | | |
|---|---|---|---|
| 2011/0244332 A1* | 10/2011 | Saito | H01M 4/505 429/224 |
| 2013/0228718 A1 | 9/2013 | Lee et al. | |
| 2021/0119199 A1 | 4/2021 | Sugiyama | |
| 2021/0119207 A1 | 4/2021 | Sugiyama | |

FOREIGN PATENT DOCUMENTS

| | | |
|---|---|---|
| JP | 2012-204281 A | 10/2012 |
| JP | 2013-214385 A | 10/2013 |
| JP | 2013-254721 A | 12/2013 |
| JP | 2014-517480 A | 7/2014 |
| JP | 2015-176644 A | 10/2015 |
| JP | 2016-033887 A | 3/2016 |
| JP | 2017-084807 A | 5/2017 |

* cited by examiner

*Primary Examiner* — Kevin E Yoon

(74) *Attorney, Agent, or Firm* — Dinsmore & Shohl LLP

(57) ABSTRACT

A positive electrode includes a first active material and a second active material. The first active material contains at least Li, Mn, and O as constituent elements and includes an O2 type structure. The second active material contains at least Li, a transition metal element, and O as constituent elements but does not contain Mn, and includes the O2 type structure.

5 Claims, 3 Drawing Sheets

POSITIVE ELECTRODE AND LITHIUM ION BATTERY

CROSS-REFERENCE TO RELATED APPLICATION

This application claims priority to Japanese Patent Application No. 2021-185854 filed on Nov. 15, 2021, incorporated herein by reference in its entirety.

BACKGROUND

1. Technical Field

The present application discloses a positive electrode and a lithium ion battery.

2. Description of Related Art

Japanese Unexamined Patent Application Publication No. 2015-176644 (JP 2015-176644 A) discloses a positive electrode active material containing at least Li, Co, Ni, Mn, and O as constituent elements and having an O2 type structure. Japanese Unexamined Patent Application Publication No. 2016-O33887 (JP 2016-O33887A) discloses a technique for adhering at least one of a predetermined composite oxide and composite fluoride to the surface of the positive electrode active material having the O2 type structure.

SUMMARY

According to the new findings of the present inventor, the positive electrode active material containing at least Li, Mn and O as constituent elements and having the O2 type structure has a high resistance in a redox region of Mn of 3 V (vs. $Li/Li^+$) or less. When the positive electrode is formed using the positive electrode active material described above, the resistance of the positive electrode as a whole increases in the redox region of Mn, and as a result, the capacity of the positive electrode may decrease. In this respect, there is room for improvement in capacity of the positive electrode of the related art.

The present application discloses a positive electrode as one of the ways for solving the above issue. The positive electrode includes a first active material and a second active material. The first active material contains at least Li, Mn, and O as constituent elements and includes an O2 type structure. The second active material contains at least Li, a transition metal element, and O as constituent elements but does not contain Mn, and includes the O2 type structure.

In the positive electrode according to the present disclosure, the first active material may contain at least Li, Mn, at least one of Ni and Co, and O as the constituent elements.

In the positive electrode according to the present disclosure, the second active material may contain at least Li, Co, and O as the constituent elements.

The positive electrode according to the present disclosure may contain, with a total of the first active material and the second active material being 100% by mass, the first active material in an amount of 10% by mass or more and 90% by mass or less.

The present application discloses a lithium ion battery including the positive electrode of the present disclosure as one of the ways for solving the above issue.

In the positive electrode according to the present disclosure, the first active material containing Mn and the second active material not containing Mn are used in combination as the positive electrode active material having the O2 type structure. In this case, the resistance of the second active material is small even at a potential in the redox region of Mn, and an increase in resistance of the positive electrode as a whole is suppressed. As a result, the capacity of the positive electrode is likely to improve.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

1. Positive Electrode

Figure 1:
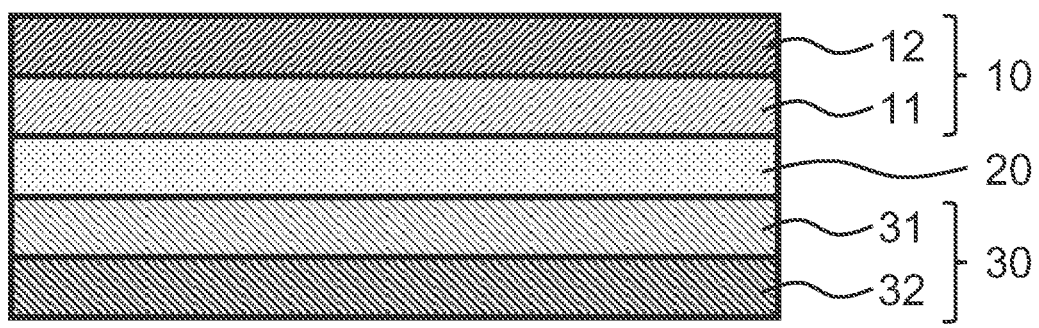
FIG. 1 schematically shows a configuration of a positive electrode according to an embodiment and a configuration of a lithium ion battery including the positive electrode.

A positive electrode according to the present disclosure includes a first active material and a second active material. The first active material contains at least Li, Mn and O as constituent elements and has an O2 type structure. The second active material contains at least Li, a transition metal element, and O as constituent elements but does not contain MN, and has the O2 type structure. As shown in FIG. 1, a positive electrode 10 according to an embodiment may include a positive electrode active material layer 11 and a positive electrode current collector 12, and in this case, the positive electrode active material layer 11 may contain the first active material and the second active material.

1.1 Positive Electrode Active Material Layer

The positive electrode active material layer 11 contains at least the first active material and the second active material as the positive electrode active material, and may optionally contain an electrolyte, a conductive aid, a binder, and the like. The contents of each of the positive electrode active material, the electrolyte, the conductive aid, the binder, and the like in the positive electrode active material layer 11 may be appropriately determined in accordance with the target battery performance. For example, on assumption that the entire positive electrode active material layer 11 (total solid content) is 100% by mass, the content of the positive electrode active material may be 40% by mass or more, 50% by mass or more, or 60% by mass or more, or may be 100% by mass or less or 90% by mass or less. The shape of the positive electrode active material layer 11 is not particularly limited, and may be, for example, a sheet-shaped positive electrode active material layer 11 having a substantially flat surface. The thickness of the positive electrode active material layer 11 is not particularly limited, and may be, for example, 0.1 μm or more or 1 μm or more, or may be 2 mm or less or 1 mm or less.

1.1.1 Positive Electrode Active Material

The positive electrode active material layer 11 contains at least the first active material and the second active material as the positive electrode active material. The first active material contains at least Li, Mn and O as constituent elements and has the O2 type structure. The second active material contains at least Li, a transition metal element, and O as constituent elements but does not contain Mn, and has the O2 type structure. As described above, in the positive electrode according to the present disclosure, the first active material containing Mn and the second active material not containing Mn are used in combination as the positive electrode active material having the O2 type structure, whereby the resistance of the second active material is small even at a potential of 3 V (vs. Li/Li$^+$) or less in the redox region of Mn, and further, an increase in the resistance of the positive electrode as a whole is suppressed. That is, the weakness of the first active material can be supplemented by the second active material, and the capacity of the positive electrode can be easily improved.

The first active material contains at least Mn as a constituent element, and the resistance tends to be high in the redox region of Mn. In this respect, it is difficult to obtain a high positive electrode capacity with the first active material alone. On the other hand, constructing a lithium ion battery using the positive electrode containing the first active material makes it easier to improve the cycle characteristics and the like as a secondary battery.

The first active material may contain a transition metal element other than Mn together with Mn as a constituent element. Especially, when the first active material contains at least Li, Mn, at least one of Ni and Co, and O as constituent elements, and in particular, when the first active material contains Li, Mn, Ni, Co, and O as constituent elements, the cycle characteristics and the like when the first active material is used for a lithium-ion battery are more likely to be improved.

The first active material may have a chemical composition represented by $Li_xMn_aNi_bCo_cO_{2\pm\delta}$. x, a, b and c are not particularly limited as long as the O2 type structure can be maintained. For example, x satisfies 0<x<1. x may be 0.1 or more, 0.2 or more, 0.3 or more, 0.4 or more, 0.5 or more or 0.6 or more, or may be 0.9 or less or 0.8 or less. Further, for example, a, b, and c satisfy 0<a<1, 0≤b<1, and 0≤c<1, respectively. a may be more than 0, 0.1 or more, 0.2 or more, 0.3 or more, or 0.4 or more, or may be 0.9 or less, 0.8 or less, 0.7 or less, or 0.6 or less. b may be 0 or more or 0.1 or more, and may be 0.9 or less, 0.8 or less, 0.7 or less, 0.6 or less, 0.5 or less, 0.4 or less or 0.3 or less. c may be more than 0, 0.1 or more, 0.2 or more, or may be 0.9 or less, 0.8 or less, 0.7 or less, 0.6 or less, 0.5 or less, or 0.4 less. a+b+c may be 0.8 or more or 0.9 or more, or may be 1.2 or less or 1.1 or less.

The second active material does not contain Mn as a constituent element and has a small diffusion resistance even at the redox potential of Mn. On the other hand, the second active material has an issue different from that of the first active material, such as Na easily remaining in the crystal structure. In this respect, it is difficult to improve the cycle characteristics and the like when the second active material alone is used for a lithium ion battery, and it is also difficult to obtain a high positive electrode capacity.

The transition metal element constituting the second active material only needs to be any transition metal element other than Mn, and the type is not particularly limited as long as the O2 type structure can be maintained. For example, Co, Ni and the like are exemplified. In particular, when the second active material contains at least Li, Co and O as constituent elements, combining the second active material with the first active material above makes it easier to further improve the positive electrode capacity.

The second active material may have a chemical composition represented by $Li_xNi_dCo_eO_{2\pm\delta}$. x, d, and e are not particularly limited as long as the O2 type structure can be maintained. For example, x satisfies 0<x<1. x may be 0.1 or more, 0.2 or more, 0.3 or more, 0.4 or more, 0.5 or more or 0.6 or more, or may be 0.9 or less or 0.8 or less. Further, for example, d satisfies 0≤d<1 and e satisfies 0<e≤1.2. d may be 0 or more or 0.1 or more, or may be 0.9 or less, 0.8 or less, 0.7 or less, 0.6 or less, 0.5 or less, 0.4 or less or 0.3 or less. e may be more than 0, 0.1 or more, 0.2 or more, 0.3 or more, 0.4 or more, or 0.5 or more, or may be 1.0 or less or 0.9 or less. d+e may be 0.8 or more or 0.9 or more, or may be 1.2 or less or 1.1 or less.

A protective layer containing a Li ion conductive oxide may be formed on the surface of the positive electrode active material. That is, the positive electrode active material layer 11 may contain a first complex including the first active material and a protective layer provided on the surface thereof, or may contain a second complex including the second active material and a protective layer provided on the surface thereof. With the above, a reaction between the positive electrode active material and the sulfide (for example, a sulfide solid electrolyte to be described later) can be easily suppressed. Examples of the Li ion conductive oxide include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. The coverage (area ratio) of the protective layer may be, for example, 70% or more, 80% or more, or 90% or more. The thickness of the protective layer may be, for example, 0.1 nm or more or 1 nm or more, or may be 100 nm or less or 20 nm or less.

The shape of the positive electrode active material may be any shape that is common as the active material of the battery. For example, both the first active material and the second active material may be in the form of particles. The positive electrode active material particles may be solid particles, hollow particles, or those having voids. The positive electrode active material particles may be primary particles or secondary particles each of which includes multiple primary particles that are aggregated. An average particle size (D50) of the positive electrode active material particles may be, for example, 1 nm or more, 5 nm or more, or 10 nm or more, or may be 500 μm or less, 100 μm or less, 50 μm or less, or 30 μm or less. The average particle diameter D50 referred to in the present application is a particle diameter (median diameter) at an integrated value of 50% in a volume-based particle size distribution obtained by a laser diffraction and scattering method.

The content ratio of the first active material and the second active material in the positive electrode 10 is not particularly limited. In particular, on assumption that the total of the first active material and the second active material is 100% by mass, the capacity is more likely to be improved when the positive electrode 10 contains the first active material of 10% by mass or more and 90% by mass or less.

The positive electrode active material layer 11 may contain only the above-mentioned first active material and second active material as the positive electrode active material. Alternatively, the positive electrode active material layer 11 may contain a different type of positive electrode active material (other positive electrode active material) in addition to the above-mentioned first active material and second active material. From the viewpoint of further enhancing the effect of the technique of the present disclosure, the content of the other positive electrode active material in the positive electrode active material layer 11 may be small. For example, the total of the first active material and the second active material may be 50% by mass or more, 60% by mass or more, 70% by mass or more, 80% by mass or more, 90% by mass or more, 95% by mass or more, or 99% by mass or more of the total positive electrode active material contained in the positive electrode active material layer 11.

1.1.2 Electrolyte

The electrolyte may be a solid electrolyte or a liquid electrolyte (electrolyte solution). When the positive electrode 10 is a positive electrode for an all-solid-state battery, the positive electrode active material layer 11 may contain a solid electrolyte as an electrolyte. Further, when the positive electrode 10 is a positive electrode for an electrolytic solution battery, the positive electrode active material layer 11 may contain an electrolyte solution as an electrolyte.

As the solid electrolyte, a known solid electrolyte for the battery may be used. The solid electrolyte may be an inorganic solid electrolyte or an organic polymer electrolyte. In particular, the inorganic solid electrolyte is useful in ionic conductivity and heat resistance. Examples of the inorganic solid electrolyte include oxide solid electrolytes such as lithium lanthanum dylconate, LiPON, $Li_{1+x}Al_xGe_{2-x}(PO_4)_3$, Li—SiO-based glass, and Li—Al—S—O-based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$. Especially, the performance of the sulfide solid electrolyte, in particular, the sulfide solid electrolyte containing $Li_2S$—$P_2S_5$, is high. The solid electrolyte may be amorphous or crystalline. The solid electrolyte may be in the form of particles, for example. Only one type of solid electrolyte may be used alone, or two or more types may be used in combination.

The electrolytic solution may contain, for example, lithium ions as carrier ions. The electrolytic solution may be an aqueous electrolytic solution or a non-aqueous electrolytic solution. The composition of the electrolytic solution may be the same as that known as the composition of the electrolytic solution of the lithium ion battery. For example, as the electrolytic solution, a solution obtained by dissolving a lithium salt in a carbonate-based solvent at a predetermined concentration can be used. Examples of the carbonate solvent include fluoroethylene carbonate (FEC), ethylene carbonate (EC), dimethyl carbonate (DMC) and the like. Examples of the lithium salt include $LiPF_6$ and the like.

1.1.3 Conductive Aid

As a conductive aid, carbon materials such as vapor phase carbon fiber (VGCF), acetylene black (AB), ketjen black (KB), carbon nanotube (CNT), and carbon nanofiber (CNF); and metal materials such as nickel, aluminum, and stainless steel. The conductive aid may be, for example, in the form of particles or fibers, and its size is not particularly limited. Only one type of conductive aid may be used alone, or two or more types may be used in combination.

1.1.4 Binder

Examples of the binder include a butadiene rubber (BR)-based binder, a butylene rubber (IIR)-based binder, an acrylate-butadiene rubber (ABR)-based binder, a styrene-butadiene rubber (SBR)-based binder, a polyvinylidene fluoride (PVdF)-based binder, and a polytetrafluoroethylene (PTFE)-based binder and a polyimide (PI)-based binder. Only one type of conductive aid may be used alone, or two or more types may be used in combination.

1.2 Positive Electrode Current Collector

As shown in FIG. 1, the positive electrode 10 may include the positive electrode current collector 12 in contact with the positive electrode active material layer 11. As the positive electrode current collector 12, any general positive electrode current collector of the battery can be adopted. Further, the positive electrode current collector 12 may be in the form of a foil, a plate, a mesh, a punching metal, a foam, or the like. The positive electrode current collector 12 may be made of a metal foil or a metal mesh. In particular, a metal foil is useful in handleability and the like. The positive electrode current collector 12 may be made of a plurality of foils. Examples of the metal constituting the positive electrode current collector 12 include Cu, Ni, Cr, Au, Pt, Ag, Al, Fe, Ti, Zn, Co, and stainless steel. In particular, from the viewpoint of ensuring oxidation resistance, the positive electrode current collector 12 may contain Al. The positive electrode current collector 12 may have some kind of coat layer on its surface for the purpose of adjusting resistance or the like. Further, the positive electrode current collector 12 may be a metal foil or a base material on which the above metal is plated or vapor-deposited. Further, when the positive electrode current collector 12 is composed of a plurality of metal foils, some kind of layer may be provided between the metal foils. The thickness of the positive electrode current collector 12 is not particularly limited. For example, the thickness may be 0.1 µm or more or 1 µm or more, or may be 1 mm or less or 100 µm or less.

1.3 Others

In addition to the above configuration, the positive electrode 10 may have a general configuration as a positive electrode of a battery. For example, the positive electrode 10 includes a tab and a terminal. The positive electrode 10 can be produced by a known method except that the above-mentioned first active material and second active material are used in combination as the positive electrode active material. For example, the positive electrode active material layer 11 can be easily formed by molding a positive electrode mixture containing the above-mentioned various components by a dry method or a wet method. The positive electrode active material layer 11 may be formed together with the positive electrode current collector 12, or may be formed separately from the positive electrode current collector 12.

2. Lithium Ion Battery

The lithium ion battery according to the present disclosure includes the above-mentioned positive electrode. For example, as shown in FIG. 1, the lithium ion battery 100 according to the embodiment includes a positive electrode 10, an electrolyte layer 20, and a negative electrode 30. The positive electrode 10 is as described above.

2.1 Electrolyte Layer

The electrolyte layer 20 contains at least an electrolyte. When the lithium ion battery 100 is a solid-state battery (the battery may be a battery that contains a solid electrolyte and in which a liquid electrolyte is partially used in combination, or an all-solid-state battery that does not contain a liquid electrolyte), the electrolyte layer 20 may contain a solid electrolyte, and may further optionally contain a binder or the like. In this case, the content of the solid electrolyte and the binder or the like in the electrolyte layer 20 is not particularly limited. On the other hand, when the lithium ion battery 100 is an electrolytic solution battery, the electrolyte layer 20 may contain an electrolytic solution, and further, may include a separator or the like that holds the electrolytic solution and avoids contact between the positive electrode active material layer 11 and a negative electrode active material layer 31. The thickness of the electrolyte layer 20 is not particularly limited, and may be, for example, 0.1 μm or more or 1 μm or more, or may be 2 mm or less or 1 mm or less.

The solid electrolyte, the electrolytic solution, the binder and the like are as described above. The separator only needs to be a separator usually used in a lithium ion battery, and examples thereof include those made of a resin such as polyethylene (PE), polypropylene (PP), polyester and polyamide. The separator may have a single-layer structure or a multi-layer structure. Examples of the separator having a multi-layer structure include a separator having a two-layer structure of PE-PP, a separator having a three-layer structure of PP-PE-PP or PE-PP-PE, and the like. The separator may be made of a non-woven fabric such as a cellulose nonwoven fabric, a resin non-woven fabric, or a glass fiber non-woven fabric.

2.2 Negative Electrode

As shown in FIG. 1, the negative electrode 30 may include the negative electrode active material layer 31 and a negative electrode current collector 32.

2.2.1 Negative Electrode Active Material Layer

The negative electrode active material layer 31 contains at least the negative electrode active material, and may optionally contain an electrolyte, a conductive aid, a binder, and the like. The contents of each of the positive electrode active material, the electrolyte, the conductive aid, the binder, and the like in the negative electrode active material layer 31 may be appropriately determined in accordance with the target battery performance. For example, on assumption that the entire negative electrode active material layer 31 (total solid content) is 100% by mass, the content of the negative electrode active material may be 40% by mass or more, 50% by mass or more, or 60% by mass or more, or may be 100% by mass or less, or 90% by mass or less. The shape of the negative electrode active material layer 31 is not particularly limited, and may be, for example, a sheet-shaped negative electrode active material layer having a substantially flat surface. The thickness of the negative electrode active material layer 31 is not particularly limited, and may be, for example, 0.1 μm or more or 1 μm or more, or may be 2 mm or less or 1 mm or less.

As the negative electrode active material, various materials of which potential for storing and discharging lithium ions (charge-discharge potential) is lower than that of the above-mentioned positive electrode active material can be adopted. For example, a silicon-based active material such as Si, Si alloy, and silicon oxide; a carbon-based active material such as graphite and hard carbon; various oxide-based active materials such as lithium titanate; metallic lithium, lithium alloy, and the like can be adopted. Only one type of the negative electrode active material may be used alone, or two or more types may be used in combination.

The shape of the negative electrode active material may be any shape that is common as the negative electrode active material of the battery. For example, the negative electrode active material may be in the form of particles. The negative electrode active material particles may be primary particles or secondary particles each of which includes multiple primary particles that are aggregated. The average particle size (D50) of the negative electrode active material particles may be, for example, 1 nm or more, 5 nm or more, or 10 nm or more, or may be 500 μm or less, 100 μm or less, 50 μm or less, or 30 μm or less. Alternatively, the negative electrode active material may be in the form of a sheet (foil-shape, film-shape) such as lithium foil. That is, the negative electrode active material layer 31 may be made of a sheet of the negative electrode active material.

Examples of the electrolyte that can be contained in the negative electrode active material layer 31 include the above-mentioned solid electrolyte and the electrolytic solution. When the lithium ion battery 100 is a solid battery (same as above), the performance of the battery is likely to improve in the case where the negative electrode active material layer 31 contains a solid electrolyte, in particular, a sulfide solid electrolyte, further in particular, a sulfide solid electrolyte containing $Li_2S$—$P_2S_5$. Examples of the conductive aid that can be contained in the negative electrode active material layer 31 include the above-mentioned carbon materials and the above-mentioned metal materials. The binder that can be contained in the negative electrode active material layer 31 may be appropriately selected from, for example, those exemplified as the binder that can be contained in the positive electrode active material layer 11 described above.

2.2.2 Negative Electrode Current Collector

As shown in FIG. 1, the negative electrode 30 may include the negative electrode current collector 32 in contact with the negative electrode active material layer 31. As the negative electrode current collector 32, any general negative electrode current collector of the battery can be adopted. Further, the negative electrode current collector 32 may be in the form of a foil, a plate, a mesh, a punching metal, a foam, or the like. The negative electrode current collector 32 may be a metal foil or a metal mesh, or may be a carbon sheet. In particular, a metal foil is useful in handleability and the like. The negative electrode current collector 32 may be made of a plurality of foils or sheets. Examples of the metal constituting the negative electrode current collector 32 include Cu, Ni, Cr, Au, Pt, Ag, Al, Fe, Ti, Zn, Co, and stainless steel. In particular, the negative electrode current collector 32 may contain at least one metal selected from Cu, Ni, and stainless steel from the viewpoint of ensuring reduction resistance and being difficult to alloy with lithium. The negative electrode current collector 32 may have some kind of coat layer on its surface for the purpose of adjusting resistance or the like. Further, the negative electrode current collector 32 may be a metal foil or a base material on which the above metal is plated or vapor-deposited. Further, when the negative electrode current collector 32 is composed of a plurality of metal foils, some layer may be provided between the metal foils. The thickness of the negative electrode current collector 32 is not particularly limited. For example, the thickness may be 0.1 µm or more or 1 µm or more, or may be 1 mm or less or 100 µm or less.

2.3 Others

The lithium ion battery 100 may have each of the above configurations housed inside an exterior body. As the exterior body, any known exterior body of the battery can be adopted. Further, a plurality of batteries 100 may be arbitrarily electrically connected and optionally stacked to form an assembled battery. In this case, the assembled battery may be housed inside a known battery case. The lithium-ion battery 100 may also have a trivial configuration such as necessary terminals. Examples of the shape of the lithium ion battery 100 include a coin type, a laminated type, a cylindrical type, and a square type.

The lithium ion battery 100 can be manufactured by applying a known method. For example, the lithium ion battery 100 can be manufactured as follows. However, the manufacturing method of the lithium ion battery 100 is not limited to the following method, and each layer may be formed by, for example, dry molding or the like.

(1) A negative electrode layer slurry is obtained by dispersing the negative electrode active material or the like constituting the negative electrode active material layer in a solvent. The solvent used in this case is not particularly limited. Water or various organic solvents can be used, and N-methylpyrrolidone (NMP) may be used. Then, the negative electrode layer slurry is applied to the surface of the negative electrode current collector using a doctor blade or the like, and then dried to form the negative electrode active material layer on the surface of the negative electrode current collector to form a negative electrode.

(2) A positive electrode layer slurry is obtained by dispersing the positive electrode active material or the like constituting the positive electrode active material layer in a solvent. The solvent used in this case is not particularly limited. Water or various organic solvents can be used, and N-methylpyrrolidone (NMP) may be used. The positive electrode layer slurry is applied to the surface of the positive electrode current collector using a doctor blade or the like, and then dried to form a positive electrode active material layer on the surface of the positive electrode current collector to form a positive electrode.

(3) Each layer is laminated so as to interpose the electrolyte layer (solid electrolyte layer or separator) between the negative electrode and the positive electrode, and a laminated body in which the negative electrode current collector, the negative electrode active material layer, the electrolyte layer, the positive electrode active material layer and the positive electrode current collector are included in this order is obtained. Other members such as terminals are attached to the laminated body as needed.

(4) The laminated body is housed in a battery case, and in the case of an electrolytic solution battery, the battery case is filled with an electrolytic solution, and the laminated body is immersed in the electrolytic solution and is sealed in the battery case so as to form the secondary battery. In the case of an electrolytic solution battery, the electrolytic solution may be contained in the negative electrode active material layer, the separator, and the positive electrode active material layer in the step (3) above.

3. Battery System

The technique of the present disclosure also has an aspect as a system for controlling charging and discharging of a lithium ion battery. That is, the battery system according to the present disclosure includes the above-mentioned lithium ion battery 100 and a control unit (not shown) that controls charging and discharging of the lithium ion battery 100. The control unit may control discharging of the lithium ion battery 100 such that a positive electrode potential at a discharge termination potential equals to 3 V (vs. Li/Li$^+$) or less. As described above, according to the technique of the present disclosure, the resistance of the second active material is small even at a potential of 3 V (vs. Li/Li$^+$) or less in the redox region of Mn, and an increase in the resistance of the positive electrode as a whole is suppressed. That is, even when the positive electrode potential at the discharge termination potential is controlled to be a potential in the redox region of Mn, an increase in the resistance of the positive electrode is suppressed, and a high discharge capacity can be easily obtained.

The control unit may be any unit as long as the control unit can control charging and discharging of the lithium ion battery 100 as described above. When the charging and discharging of the lithium ion battery 100 is controlled by the control unit, the charge termination potential of the lithium ion battery 100 is not particularly limited and can be determined in accordance with the target battery performance.

Hereinafter, the technique of the present disclosure will be described in more detail with reference to examples. However, the technique of the present disclosure is not limited to the following examples.

1. Production of Positive Electrode Active Material

The first active material and the second active material as the positive electrode active material were prepared by the following procedure. Both the first active material and the second active material have the O2 type structure. The first active material contains Mn, and the second active material does not contain Mn. Further, as a third active material, $LiNi_{0.5}Mn_{0.5}O_2$ having an O3 type structure was prepared.

1.1 First Active Material ($Li_{0.7}Mn_{0.5}Ni_{0.2}Co_{0.3}O_2$)

A solution 1A was obtained by dissolving 43.06 g of $Mn(NO_3)_2 \cdot 6H_2O$, 17.97 g of $Ni(NO_3)_2 \cdot 6H_2O$, and 26.98 g of $Co(NO_3)_2 \cdot 6H_2O$ in 250 g of pure water. A solution 2A was obtained by dissolving 31.8 g of $Na_2CO_3$ and 10.1 mL of aqueous ammonia in 250 g of pure water. A mixed solution 3A was obtained by simultaneously adding the solution 1A and the solution 2A dropwise to a beaker containing 100 mL of pure water. The resulting mixed solution 3A was stirred at 50° C. overnight. After being stirred, the mixed solution 3A was washed with pure water and then dried at 120° C. for 48 hours or more to obtain an intermediate material 1A (($Mn_{0.5}Ni_{0.2}Co_{0.3})CO_3$).

After 13.5 g of the intermediate material 1A and 4.28 g of $Na_2CO_3$ were mixed in a mortar and pressed and compacted with a hydrostatic press, the mixture was held at 600° C. for 6 hours, held at 900° C. for 24 hours, and then burnt to obtain an intermediate material 2A ($Na_{0.7}Mn_{0.5}Ni_{0.2}Co_{0.3}O_2$).

3.5 g of the intermediate material 2A, 4.77 g of LiCl, and 7.75 g of LiNO$_3$ were mixed and held at 280° C. for 1 hour such that the materials were dissolved. Then, the dissolved mixture was washed with pure water, filtered and dried to obtain Li$_{0.7}$Mn$_{0.5}$Ni$_{0.2}$Co$_{0.3}$O$_2$ as the first active material.

1.2 Second Active Material

A solution 1B was obtained by dissolving 89.93 g of Co(NO$_3$)$_2$.6H$_2$O in 250 g of pure water. A solution 2B was obtained by dissolving 31.8 g of Na$_2$CO$_3$ and 10.1 mL of aqueous ammonia in 250 g of pure water. A mixed solution 3B was obtained by simultaneously adding the solution 1B and the solution 2B dropwise to a beaker containing 100 mL of pure water. The resulting mixed solution 3B was stirred at 50° C. overnight. After being stirred, the mixed solution 3B was washed with pure water and then dried at 120° C. for 48 hours or more to obtain an intermediate material 1B (CoCO$_3$).

After 13.5 g of the intermediate material 1B and 5.1 g of Na$_2$CO$_3$ were mixed in a mortar and pressed and compacted with a hydrostatic press, the mixture was held at 600° C. for 6 hours, held at 900° C. for 24 hours, and then burnt to obtain an intermediate material 2B (Na$_{0.7}$CoO$_2$).

3.5 g of the intermediate material 2B, 4.77 g of LiCl, and 7.75 g of LiNO$_3$ were mixed and held at 280° C. for 1 hour such that the materials were dissolved. Then, the dissolved mixture was washed with pure water, filtered and dried to obtain Li$_{0.7}$CoO$_2$ as the second active material.

2. Production of Positive Electrode

85% by mass of the positive electrode active material (a mass ratio of the first active material to the second active material is examined from 100:0 to 0:100, or a mass ratio of the first active material to the third active material is examined from 100:0 to 0:100), 10% by mass of acetylene black (LI400) as a conductive aid, and 5% by mass of polyvinylidene fluoride as a binder were mixed to obtain the slurry using N-methyl pyrrolidone, and then the slurry was applied onto an Al foil as the positive electrode current collector. Then, the positive current collector was vacuum dried and molded at 120° C. to obtain the positive electrode.

2.1 When First Active Material and Second Active Material are Combined

In Comparative Example 1, Examples 1 to 6 and Comparative Example 2, at least one of the first active material and the second active material was used as the positive electrode active material for producing the positive electrode.

2.1.1 Comparative Example 1

The mass ratio of the first active material and the second active material in the positive electrode active material was set to 100:0.

2.1.2 Example 1

The mass ratio of the first active material and the second active material in the positive electrode active material was set to 90:10.

2.1.3 Example 2

The mass ratio of the first active material and the second active material in the positive electrode active material was set to 80:20.

2.1.4 Example 3

The mass ratio of the first active material and the second active material in the positive electrode active material was set to 70:30.

2.1.5 Example 4

The mass ratio of the first active material and the second active material in the positive electrode active material was set to 50:50.

2.1.6 Example 5

The mass ratio of the first active material and the second active material in the positive electrode active material was set to 30:70.

2.1.7 Example 6

The mass ratio of the first active material and the second active material in the positive electrode active material was set to 10:90.

2.1.8 Comparative Example 2

The mass ratio of the first active material and the second active material in the positive electrode active material was set to 0:100.

2.2 when First Active Material and Third Active Material are Combined

In Comparative Example 1, and Comparative Examples 3 to 9, at least one of the first active material and the third active material was used as the positive electrode active material for producing the positive electrode. Comparative Example 1 is as described above.

2.2.1 Comparative Example 3

The mass ratio of the first active material and the third active material in the positive electrode active material was set to 90:10.

2.2.2 Comparative Example 4

The mass ratio of the first active material and the third active material in the positive electrode active material was set to 80:20.

2.2.3 Comparative Example 5

The mass ratio of the first active material and the third active material in the positive electrode active material was set to 70:30.

2.2.4 Comparative Example 6

The mass ratio of the first active material and the third active material in the positive electrode active material was set to 50:50.

2.2.5 Comparative Example 7

The mass ratio of the first active material and the third active material in the positive electrode active material was set to 30:70.

2.2.6 Comparative Example 8

The mass ratio of the first active material and the third active material in the positive electrode active material was set to 10:90.

2.2.7 Comparative Example 9

The mass ratio of the first active material and the third active material in the positive electrode active material was set to 0:100.

3. Preparation of Negative Electrode

For the negative electrode, metallic lithium cut to a predetermined size was used.

4. Preparation of Electrolytic Solution

As the non-aqueous electrolytic solution, an electrolytic solution manufactured by Daikin Industries, Ltd., (1.0 MLiPF$_6$/TW5(TFPC)+F3(TFEMC) 30:70 vol %+TL16 (LiDFOB 0.98 wt %)) was used.

5. Production of Coin Cell

A coin cell for evaluation was produced by injecting the above electrolytic solution into a coin-shaped cell using any of the positive electrodes of Examples 1 to 6 and Comparative Examples 1 to 9 and the above negative electrode under an inert atmosphere.

6. Measurement of Discharge Capacity

Figure 2:
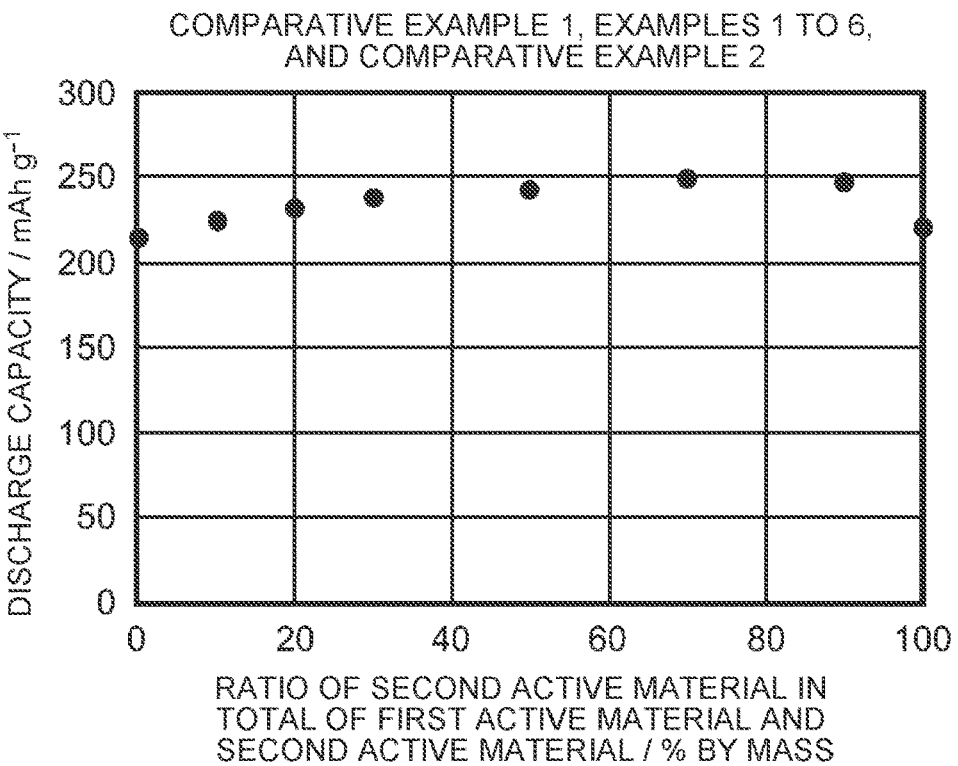
FIG. 2 shows a relationship between a mixing ratio of two types of O2 type positive electrode active materials (a first active material and a second active material) and the discharge capacity of the positive electrode.
Figure 3:
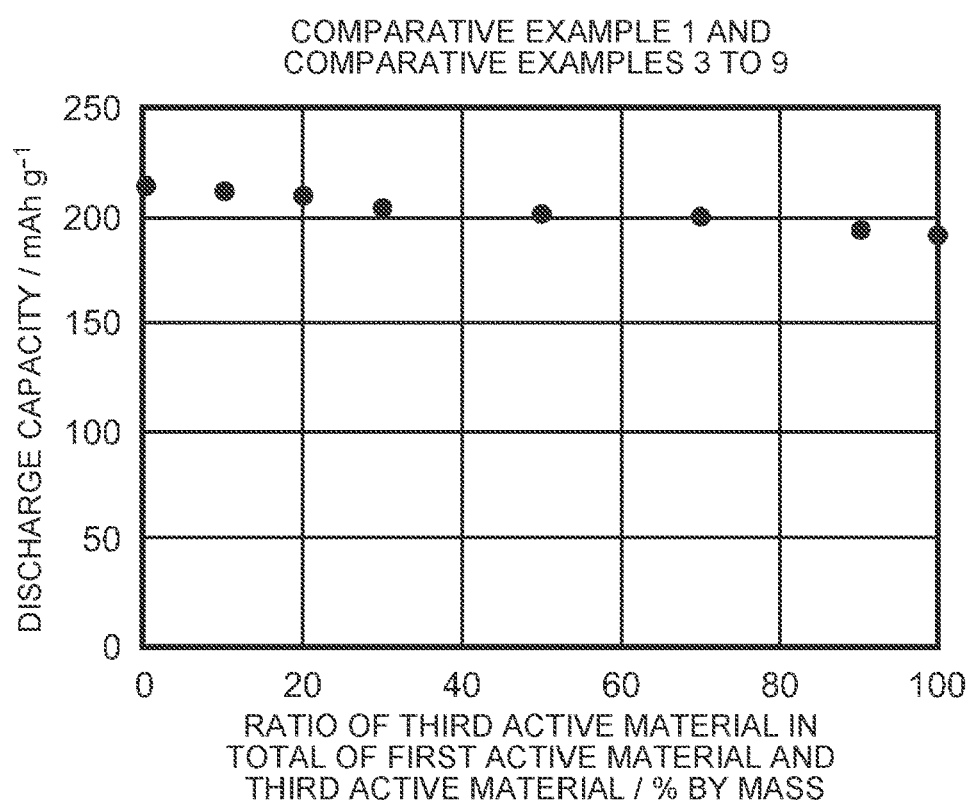
FIG. 3 shows a relationship between the mixing ratio of the O2-type positive electrode active material (the first active material) and an O3 type positive electrode active material (a third active material) and the discharge capacity of the positive electrode.

For each of the produced coin cells, the discharge capacity was measured by performing CC charging and discharging at the current density 0.1 C with the discharge termination potential being 2.0 V (vs. Li/Li$^+$) and the charge termination potential being 4.8 V (vs. Li/Li$^+$) in a constant temperature bath at 25° C. The results of Examples 1 to 6 and Comparative Examples 1 and 2 are shown in FIG. 2, and the results of Comparative Example 1 and Comparative Examples 3 to 9 are shown in FIG. 3. As is clear from the results shown in FIGS. 2 and 3, when the first active material and the second active material are combined as the positive electrode active material in the positive electrode, the discharge capacity is synergistically increased as compared with the case where the first active material is used alone, the case where the second active material is used alone, and the case where the first active material and the third active material are combined.

7. Measurement of DCIR Resistance of Positive Electrode

Figure 4:
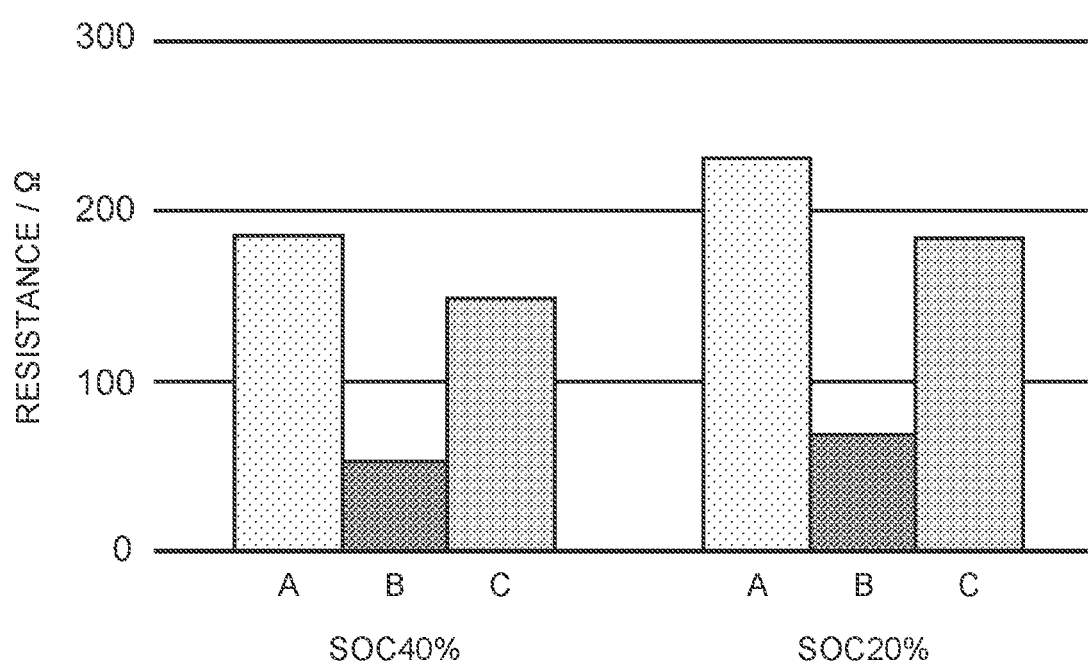
FIG. 4 shows the results of measuring a DCIR resistance of the positive electrode for each of the case of SOC 40% and the case of SOC 20%.

The DCIR resistance at SOC 40% or 20% was measured for each of the positive electrodes when the first active material is used alone as the positive electrode active material (a positive electrode A), when the second active material is used alone as the positive electrode active material (a positive electrode B), and when the first active material and the second active material are combined as the positive electrode active material (a positive electrode C, with the first active material: the second active material=70:30 (mass ratio)). The results are shown in FIG. 4. As shown in FIG. 4, the positive electrode A using only the first active material has a higher DCIR resistance than those of the positive electrodes B and C. Since SOC 40% is in the redox region of Mn, it is considered that the resistance of the first active material is high and the resistance of the positive electrode A as a whole is high. On the other hand, the positive electrode B using only the second active material does not have a high DCIR resistance even at the same SOC. The DCIR resistance of the positive electrode C in which the first active material and the second active material are used in combination is not as high as that of the positive electrode A.

8. Summary

The first active material containing at least Li, Mn and O as constituent elements and having the O2 type structure has high resistance in the redox region of Mn. Therefore, when the positive electrode is configured using only the first active material as the positive electrode active material as in Comparative Example 1, the resistance of the positive electrode as a whole increases in the redox region of Mn, and as a result, the capacity of the positive electrode decreases. On the other hand, as in Examples 1 to 6, when the first active material containing Mn and the second active material not containing Mn are used in combination as the positive electrode active material having the O2 type structure, the resistance of the second active material is small even at the potential in the redox region of Mn, and an increase in the resistance of the positive electrode as a whole is suppressed. As a result, the capacity of the positive electrode is improved. On the other hand, the second active material has an issue different from that of the first active material, such as Na easily remaining in the crystal structure. In this respect, as in Comparative Example 2 above, a high positive electrode capacity cannot be obtained with the second active material alone. Further, when the first active material and the third active material are combined as in Comparative Examples 3 to 9, it is difficult to exert the effect of the combination, and the positive electrode capacity is rather lower than that of the case of the first active material alone.

In the above embodiment, the case where the electrolytic solution battery is configured as the lithium ion battery is exemplified. However, it can be said that the above effect is achieved regardless of the type of the lithium ion battery (electrolyte solution battery, all-solid-state battery). Further, the negative electrode is not limited to the form using metallic lithium as in the above embodiment.

What is claimed is:

1. A positive electrode comprising a first active material and a second active material, wherein:
   the first active material contains at least Li, Mn, and O as constituent elements and includes an O2 type structure; and
   the second active material contains at least Li, a transition metal element, and O as constituent elements but does not contain Mn, and includes the O2 type structure.

2. The positive electrode according to claim 1, wherein the first active material contains at least Li, Mn, at least one of Ni and Co, and O as the constituent elements.

3. The positive electrode according to claim 1, wherein the second active material contains at least Li, Co, and O as the constituent elements.

4. The positive electrode according to claim 1, wherein with a total of the first active material and the second active material being 100% by mass, the first active material is contained in an amount of 10% by mass or more and 90% by mass or less.

5. A lithium ion battery comprising the positive electrode according to claim 1.

\* \* \* \* \*